(12) United States Patent
Kwon et al.

(10) Patent No.: US 10,396,333 B2
(45) Date of Patent: Aug. 27, 2019

(54) FLEXIBLE ELECTROCHEMICAL DEVICE PACK

(71) Applicant: Samsung Electronics Co., Ltd., Suwon-si, Gyeonggi-do (KR)

(72) Inventors: Moonseok Kwon, Hwaseong-si (KR); Jaeman Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 395 days.

(21) Appl. No.: 15/341,067

(22) Filed: Nov. 2, 2016

(65) Prior Publication Data

US 2017/0125771 A1    May 4, 2017

(30) Foreign Application Priority Data

Nov. 4, 2015 (KR) .................. 10-2015-0154765

(51) Int. Cl.
  *H01M 2/24* (2006.01)
  *H01M 2/20* (2006.01)
  *H01M 2/30* (2006.01)
  *H01M 2/02* (2006.01)

(52) U.S. Cl.
  CPC ......... *H01M 2/204* (2013.01); *H01M 2/0267* (2013.01); *H01M 2/30* (2013.01); *H01M 2220/30* (2013.01)

(58) Field of Classification Search
  CPC ...... H01M 2/204; H01M 2/0267; H01M 2/30; H01M 2220/30
  See application file for complete search history.

(56) References Cited

U.S. PATENT DOCUMENTS

| 5,367,431 | A  | 11/1994 | Kunishi et al. |
|-----------|----|---------|----------------|
| 2004/0009334 | A1 | 1/2004 | Miyamoto et al. |
| 2005/0031953 | A1 | 2/2005 | Watanabe et al. |
| 2013/0171485 | A1 | 7/2013 | Kodera et al. |
| 2013/0171490 | A1 | 7/2013 | Rothkopf et al. |
| 2014/0057147 | A1 | 2/2014 | Andrew et al. |
| 2014/0363702 | A1 | 12/2014 | Kim |
| 2014/0370345 | A1 | 12/2014 | Maleki et al. |

(Continued)

FOREIGN PATENT DOCUMENTS

| JP | 19930114396 A | 5/1993 |
| JP | 3631110 B2 | 12/2004 |

(Continued)

*Primary Examiner* — Jane J Rhee
(74) *Attorney, Agent, or Firm* — Cantor Colburn LLP

(57) ABSTRACT

An electrochemical device pack includes first and second electrochemical devices disposed in a length direction, where each of the first and second electrochemical devices has a top surface and a bottom surface in a thickness direction; and a first lead wire which has a ribbon shape, extends substantially in the length direction, and has a first surface and a second surface in the thickness direction. The first electrochemical device includes first and second electrode terminals exposed to an outside thereof, the second electrochemical device includes first and second electrode terminals exposed to an outside thereof, the first lead wire is electrically connected to the first electrode terminal of the first electrochemical device and the first electrode terminal of the second electrochemical device, and the first surface or the second surface of the first lead wire faces the top surface or bottom surface of the first electrochemical device.

20 Claims, 21 Drawing Sheets

(56) References Cited

U.S. PATENT DOCUMENTS

2015/0179989 A1    6/2015   Luo et al.
2016/0099456 A1    4/2016   Kwon et al.

FOREIGN PATENT DOCUMENTS

| JP | 2005166279 A | 6/2005 |
|----|--------------|--------|
| JP | 3767526 B2 | 2/2006 |
| KR | 1020050030039 A | 3/2005 |
| KR | 1020130014252 A | 2/2013 |
| KR | 1020160040931 A | 4/2016 |

FLEXIBLE ELECTROCHEMICAL DEVICE PACK

CROSS-REFERENCE TO RELATED APPLICATION

This application claims priority to Korean Patent Application No. 10-2015-0154765, filed on Nov. 4, 2015, and all the benefits accruing therefrom under 35 U.S.C. § 119, the content of which in its entirety is herein incorporated by reference.

BACKGROUND

1. Field

The disclosure relates to a flexible electrochemical device pack including a plurality of electrochemical devices.

2. Description of the Related Art

With the increase in the use of smart devices, wearable electronic devices have been developed. The wearable electronic devices may be manufactured to be flexible to improve wearability thereof. Therefore, a flexible electrochemical device pack having a high capacity may be desired to be used for a wearable electronic device to provide power thereto.

SUMMARY

Exemplary embodiments of the invention are directed to a flexible electrochemical device pack including a plurality of electrochemical devices.

Additional aspects will be set forth in part in the description which follows and, in part, will be apparent from the description, or may be learned by practice of the presented exemplary embodiments.

According to an exemplary embodiment of the invention, an electrochemical device pack, in which a length direction, a width direction and a thickness direction are defined, includes: first and second electrochemical devices, disposed in the length direction, where each of the first and second electrochemical devices has a top surface and a bottom surface in the thickness direction; and a first lead wire which has a ribbon shape, extends substantially in the length direction, and has a first surface and a second surface in the thickness direction. In such an embodiment, the first electrochemical device includes first and second electrode terminals exposed to an outside thereof, the second electrochemical device includes first and second electrode terminals exposed to an outside thereof, the first lead wire is electrically connected to the first electrode terminal of the first electrochemical device and the first electrode terminal of the second electrochemical device, and the first surface or the second surface of the first lead wire faces the top surface or bottom surface of the first electrochemical device.

In an exemplary embodiment, at least one of the first lead wire and the first electrode terminal of the first electrochemical device may include a first bent portion.

In an exemplary embodiment, at least a part of the bent portion may in a space between the first electrochemical device and the second electrochemical device.

In an exemplary embodiment, a curvature center of each of points on the bent portion may be located in one of a first space and a second space opposite each other with respect to the first bent portion, and the bent portion may have a point of which the curvature center is changed from the first space to the second space or from the second space to the first space.

In an exemplary embodiment, the first lead wire may include the bent portion, and at least a part of the bent portion of the first lead wire may be between a portion at which the first lead wire is electrically connected to the first electrode terminal of the first electrochemical device and a portion at which the first lead wire is electrically connected to the first electrode terminal of the second electrochemical device.

In an exemplary embodiment, the first lead wire may be directly electrically connected to the first electrode terminal of the first electrochemical device at a connection portion, and at least a part of the connection portion may be at a flat portion of the bent portion.

In an exemplary embodiment, the first electrode terminal or the second electrode terminal of the first electrochemical device may include a lead portion which extends outward from an inside of the first electrochemical device along the length direction.

In an exemplary embodiment, the first electrode terminal or the second electrode terminal of the first electrochemical device may include a lead portion which is curved along an axis in the width direction and extending outward from an inside of the first electrochemical device.

In an exemplary embodiment, the electrochemical device pack may further include an insulating layer in contact with at least one of the first and second surfaces of the first lead wire.

In an exemplary embodiment, the insulating layer may include an adhesive and is between the first lead wire and the first electrochemical device.

In an exemplary embodiment, the electrochemical device pack may further include an adhesive tape which partially covers the first lead wire and the first electrochemical device and fixes the first lead wire to the first electrochemical device to each other.

In an exemplary embodiment, the electrochemical device pack may further include a connection wire which electrically connects the first lead wire to the first electrode terminal of the first electrochemical device.

In an exemplary embodiment, at least one of the first electrochemical device and the second electrochemical device may be curved along an axis in the width direction.

In an exemplary embodiment, the electrochemical device pack may be bent in way such that the first electrochemical device and the second electrochemical device are inclined with respect to each other.

In an exemplary embodiment, the electrochemical device pack may further include a third electrochemical device electrically connected to the first lead wire.

In an exemplary embodiment, the electrochemical device pack may further include a second lead wire having a ribbon shape and extending substantially in the length direction, and the second lead wire may be electrically connected to the second electrode terminal of the first electrochemical device and the second electrode terminal of the second electrochemical device.

In an exemplary embodiment, the electrochemical device pack may further include an insulating film attached to the first and second lead wires.

In an exemplary embodiment, the second lead wire may include a bent portion between a portion at which the second lead wire is electrically connected to the second electrode terminal of the first electrochemical device and a portion at which the second lead wire is electrically connected to the second electrode terminal of the second electrochemical device.

In an exemplary embodiment, a curvature center of each of points on the bent portion of the second lead wire may be located in one of a first space and a second space opposite each other with respect to the second bent portion, and on the bent portion of the second lead wire has a point, of which the curvature center is changed from the first space to the second space or from the second space to the first space.

In an exemplary embodiment, at least one of the first lead wire and the first electrode terminal of the first electrochemical device may include a bent portion, and the bent portion of the second lead wire may have substantially the same shape as the bent portion of the at least one of the first lead wire and the first electrode terminal of the first electrochemical device.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1:
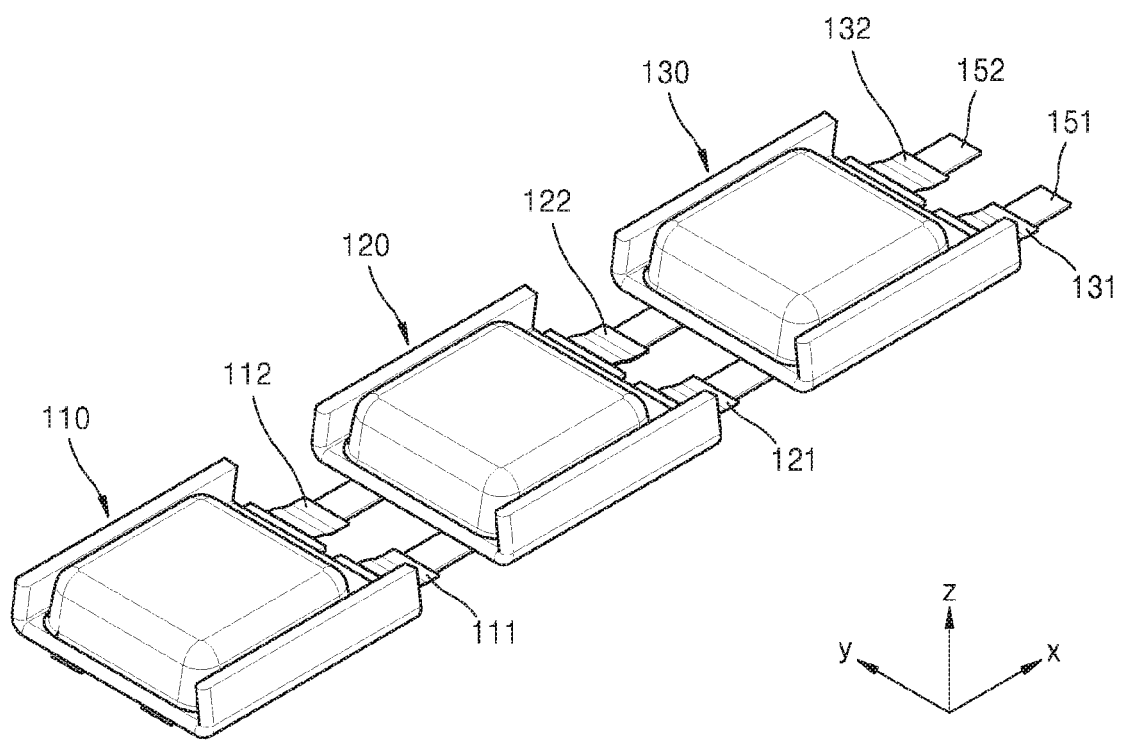
FIG. 1 is a top perspective view of an electrochemical device pack according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 2:
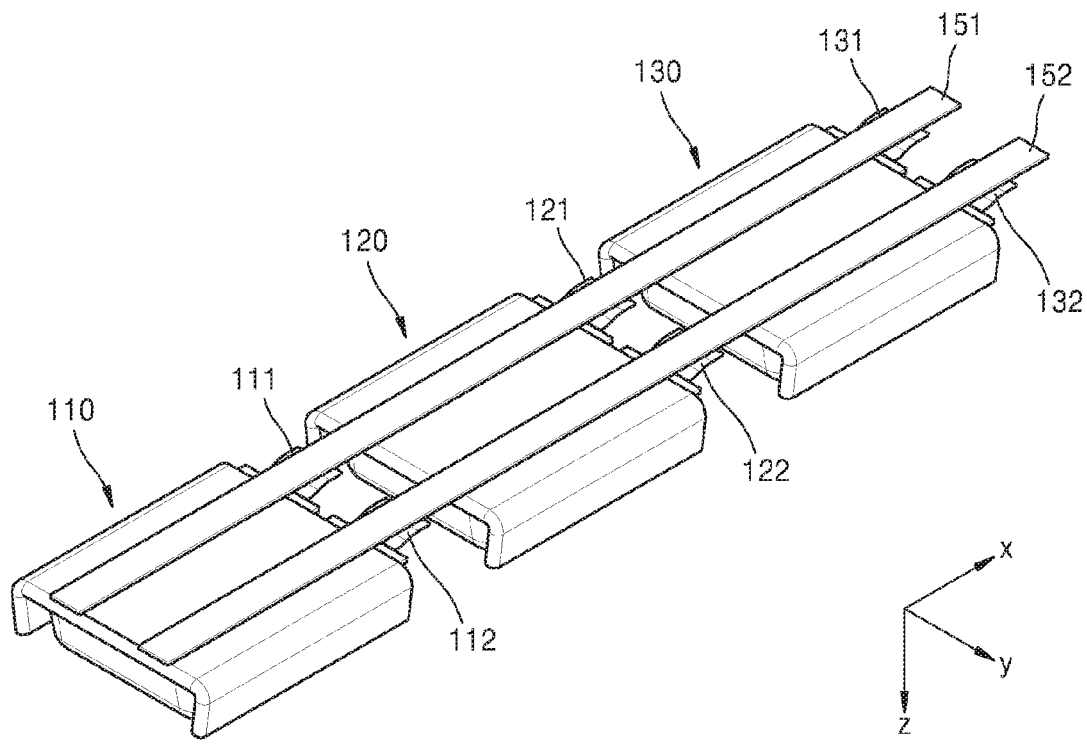
FIG. 2 is a bottom perspective view of the electrochemical device pack illustrated in FIG. 1.
Figure 3:
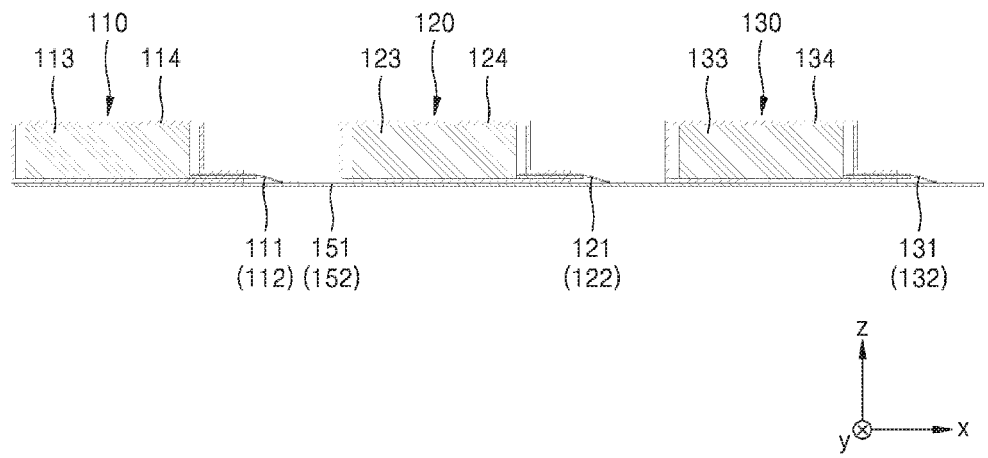
FIG. 3 is a longitudinal cross-sectional view of the electrochemical device pack illustrated in FIG. 1.

FIG. 1 is a top perspective view of an electrochemical device pack according to an exemplary embodiment. FIG. 2 is a bottom perspective view of the electrochemical device pack illustrated in FIG. 1. FIG. 3 is a longitudinal cross-sectional view of the electrochemical device pack illustrated in FIG. 1.

Referring to FIGS. 1 to 3, an exemplary embodiment of the electrochemical device pack may include a plurality of electrochemical devices, i.e., first, second, and third electrochemical devices 110, 120 and 130, that are connected to one another. The first, second, and third electrochemical devices 110, 120 and 130 may be electrically connected in parallel to one another. The electrochemical device pack may have a length direction, a width direction and a thickness direction. In FIG. 1, an x-axis direction, a y-axis direction and a z-axis direction respectively represent the length direction, the width direction and the thickness direction of the electrochemical device pack.

In such an embodiment, the electrochemical device pack may further include first and second lead wires 151 and 152 that electrically connect the first, second and third electrochemical devices 110, 120 and 130 to one another. The first, second and third electrochemical devices 110, 120 and 130 may be linearly disposed, e.g., arranged in the length direction of the electrochemical device pack. Each of the first, second and third electrochemical devices 110, 120 and 130 may have a top surface and a bottom surface in the thickness direction of the electrochemical device pack. Herein, "a surface in a direction" means a surface disposed to face the direction or a surface disposed to be perpendicular to the direction. The first, second and third electrochemical devices 110, 120 and 130 may respectively include packing materials 114, 124 and 134, electrode assemblies 113, 123 and 133, electrolytes, first electrode terminals 111, 12, and 131, and second electrode terminals 112, 122 and 132. The electrode assemblies 113, 123 and 133 and the electrolytes may be respectively disposed, e.g., packed, in the packing materials 114, 124 and 134, and the first electrode terminals 111, 121 and 131 and the second electrode terminals 112, 122 and 132 may be respectively exposed to the outside of the packing materials 114, 124, and 134. Each of the electrode assemblies 113, 123 and 133 may have a structure in which at least one first electrode (not illustrated) and at least one second electrode (not illustrated) are alternately laminated.

Each of the first electrode terminals 111, 121 and 131 may be electrically connected to the first electrode of each of the electrode assemblies 113, 123 and 133. Each of the second electrode terminals 112, 122, and 132 may be electrically connected to the second electrode of each of the electrode assemblies 113, 123, and 133. At least one of the first electrode terminals 111, 121, and 131 and the second electrode terminals 112, 122, and 132 may have a line or ribbon shape having a length. At least one of the first electrode terminals 111, 121, and 131 and the second electrode terminals 112, 122, and 132 may include a lead portion that extends outward from the inside of each of the first, second, and third electrochemical devices 110, 120, and 130, e.g., inside of each of the packing materials 114, 124 and 134 thereof, along the length direction. Sealing materials may be disposed or provided between the packing materials 114, 124, and 134 and the first and second electrode terminals 111, 121, 131, 112, 122, and 132 at the lead portion of at least one of the first and second electrode terminals 111, 121, 131, 112, 122, and 132.

In an embodiment, as shown in FIG. 2, the first and second lead wires 151 and 152 may extend in the length direction of the electrochemical device pack. The first lead wire 151 may be electrically connected to the first electrode terminals 111, 121 and 131 of the first, second and third electrochemical devices 110, 120 and 130. The second lead wire 152 may be electrically connected to the second electrode terminals 112, 122 and 132 of the first, second and third electrochemical devices 110, 120 and 130. Each of the first and second lead wires 151 and 152 may have a first surface and a second surface in the thickness direction of the electrochemical device pack. The first surface or the second surface of the first lead wire 151 may face the bottom surface of each of the first, second and third electrochemical devices 110, 120 and 130. The first surface or the second surface of the second lead wire 152 may face the bottom surface of each of the first, second and third electrochemical devices 110, 120 and 130.

The first and second lead wires 151 and 152 may have a ribbon shape. The first and second lead wires 151 and 152 may have a shape to satisfy the following relationship: average length>average width>average thickness. The first and second lead wires 151 and 152 may have an average thickness in a range of about 3 micrometers ($\mu$m) to about 500 $\mu$m. The first and second lead wires 151 and 152 may have bending stiffness (e.g., flexural rigidity) in a range of about $3.1 \times 10^{-10}$ newton square meter (N·m$^2$) to about $3.8 \times 10^{-2}$ N·m$^2$. The first and second lead wires 151 and 152 may include at least one selected from copper (Cu), aluminum (Al), iron (Fe), steel, and stainless steel, but are not limited thereto. In an exemplary embodiment, as shown in FIGS. 1 to 3, the electrochemical device pack may include three electrochemical devices, e.g., the first, second and third electrochemical devices 110, 120, and 130, but not being limited thereto. In alternative exemplary embodiments, the electrochemical device pack may include various numbers of electrochemical devices.

In an exemplary embodiment, as described above, the plurality of electrochemical devices, e.g., the first, second and third electrochemical devices 110, 120 and 130, are connected in parallel to one another by the first and second lead wires 151 and 152, a high-capacity electrochemical device pack may be effectively manufactured. In such an embodiment, due to the first and second lead wires 151 and 152 having the ribbon shape, the electrochemical device pack may have high durability with respect to a bending deformation. Since the first and second lead wires 151 and 152 having a small thickness are disposed adjacent to the first, second and third electrochemical devices 110 to 130, a volume of a space occupied by the first and second lead wires 151 and 152 in the electrochemical device pack may be effectively minimized. Accordingly, in such an embodiment, an electrochemical device pack is allowed to repeatedly and flexibly deform the shape thereof, thereby improving the durability and reliability thereof with respect to the repeated shape deformation, and has a high energy density.

Hereinafter, for convenience of description, an exemplary embodiment, where an electrochemical device pack includes a first electrochemical device 110 and a second electrochemical device 120, will be described in detail.

Exemplary embodiments, in which a bent portion 171 of a first lead wire 151 is provided between the first electrochemical device 110 and the second electrochemical device 120, are illustrated in FIGS. 4 to 10.

Figure 4:
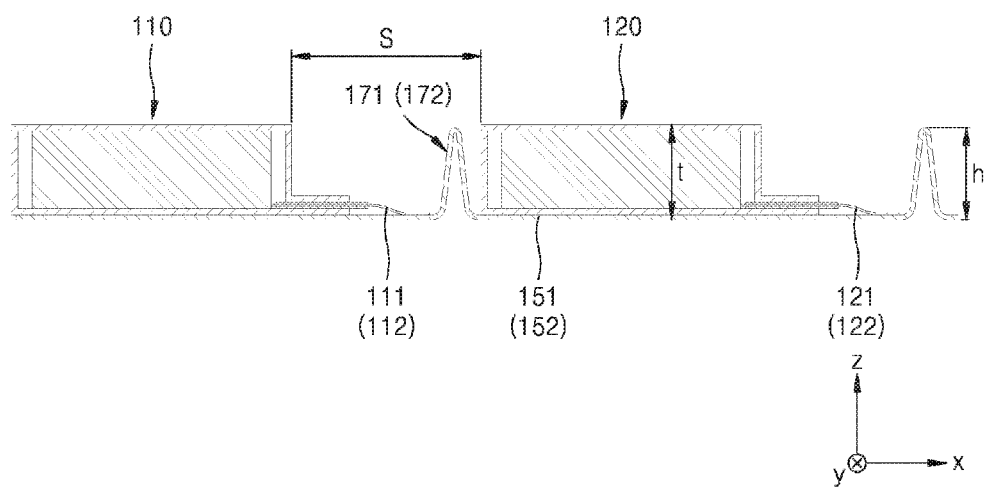
FIG. 4 is a cross-sectional view of an electrochemical device pack according to another exemplary embodiment.

FIG. 4 is a cross-sectional view of an electrochemical device pack according to an alternative exemplary embodiment.

Referring to FIG. 4, an exemplary embodiment of the electrochemical device pack may include the first and second electrochemical devices 110 and 120, and first and second lead wires 151 and 152 that electrically connect the first and second electrochemical devices 110 and 120 to each other. In such an embodiment, each of the first and second electrochemical devices 110 and 120 may have a top surface and a bottom surface in a thickness direction of the electrochemical device pack. Each of the first and second lead wires 151 and 152 may have a first surface and a second surface in the thickness direction of the electrochemical device pack. The first surface or the second surface of each of the first and second lead wires 151 and 152 may face the bottom surface of each of the first and second electrochemical devices 110 and 120.

The first lead wire 151 may be electrically connected to first electrode terminals 111 and 121 of the first and second electrochemical devices 110 and 120. The second lead wire 152 may be electrically connected to second electrode terminals 112 and 122 of the first and second electrochemical devices 110 and 120. The first and second lead wires 151 and 152 may have a ribbon shape.

The first lead wire 151 may include a bent portion 171 (hereinafter, will be referred to as a first bent portion). At least a part of the first bent portion 171 may be in a space S between the first electrochemical device 110 and the second electrochemical device 120. At least a part of the first bent portion 171 may be between a portion at which the first lead wire 151 is electrically connected to the first electrode terminal 111 of the first electrochemical device 110 and a portion at which the first lead wire 151 is electrically connected to the first electrode terminal 121 of the second electrochemical device 120. A maximum height h of the first bent portion 171 in the thickness direction of the electrochemical device pack may be about 1 millimeter (mm) or more. The maximum height h of the first bent portion 171 in the thickness direction of the electrochemical device pack may be about 30% or more of a maximum thickness t of the first electrochemical device 110 or the second electrochemical device 120.

Figure 5:
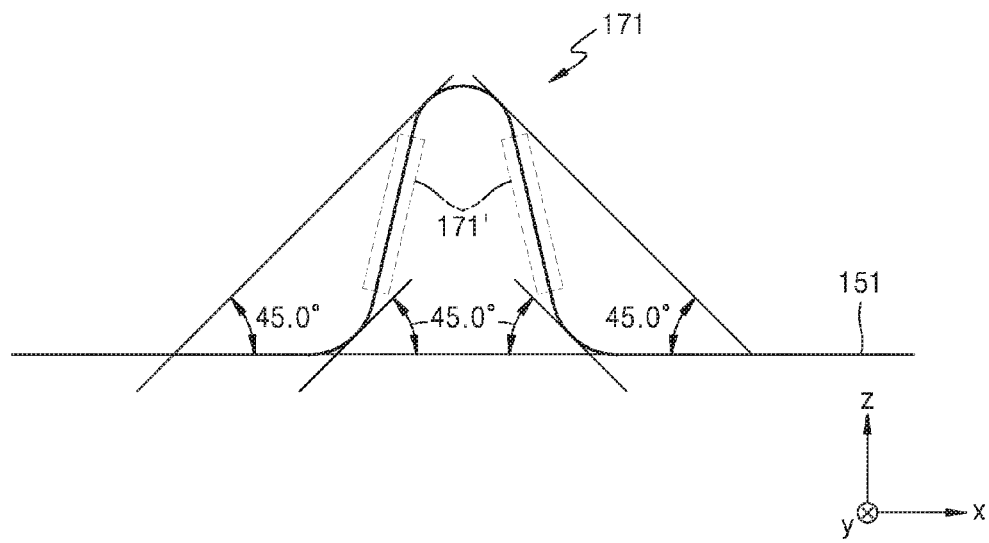
FIG. 5 is a diagram for describing a bent angle at a first bent portion of a first lead wire illustrated in FIG. 4.

FIG. 5 illustrates a bent angle at the first bent portion 171 of the first lead wire 151 illustrated in FIG. 4. Referring to FIG. 5, the first bent portion 171 may include a portion 171' (e.g., a straight or linear portion) disposed at an angle of about 45° or more with respect to a bending starting portion.

Figure 6:
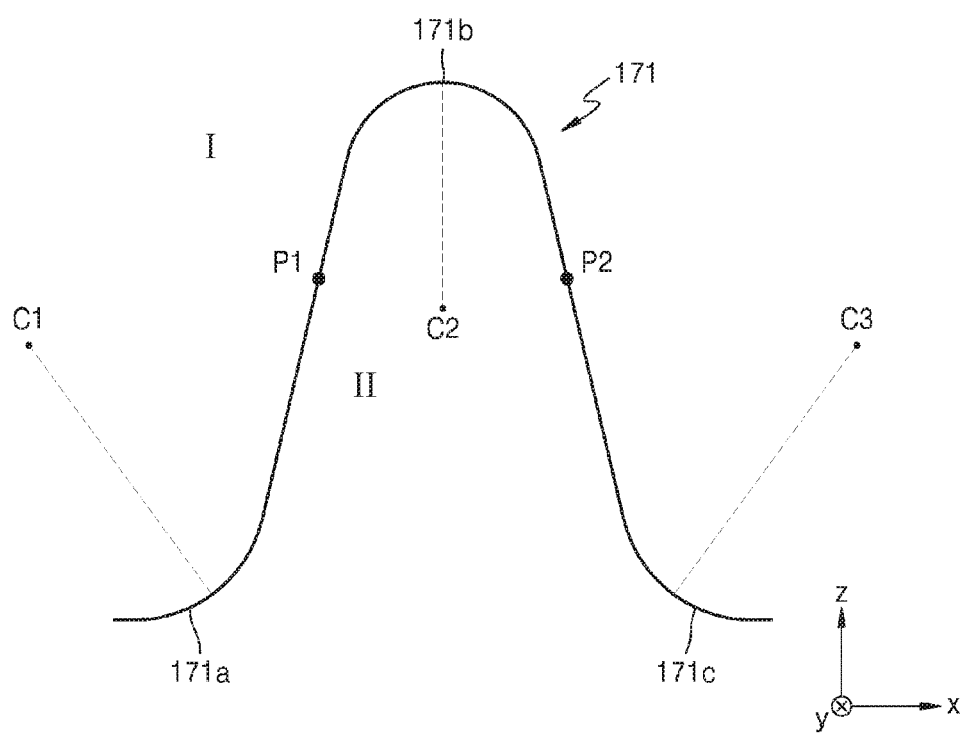
FIG. 6 is a diagram for describing a position change of a curvature center according to each of positions on the first bent portion of the first lead wire illustrated in FIG. 4.

FIG. 6 is a diagram for describing a position change of a curvature center according to each of positions on the first bent portion 171 of the first lead wire 151 illustrated in FIG. 4. Referring to FIG. 6, the first bent portion 171 may include a first valley region 171a, a ridge region 171b, and a second valley region 171c. A space around the first bent portion 171 may be divided into two spaces with respect to the first bent portion 171. That is, the space may be divided into space I defined by an upper side of the first bent portion 171 and space II defined by a lower side of the first bent portion 171. In such an embodiment, a curvature center C1 of one point placed on the first valley region 171a of the first bent portion 171 may be located in the space I. In such an embodiment, a curvature center C3 of one point placed on the second valley region 171c of the first bent portion 171 may also be located in the space I. In such an embodiment, a curvature center C2 of one point placed on the ridge region 171b of the first bent portion 171 may be located in the space II opposite to the space I. Therefore, the positions of the curvature centers of the points placed on the first bent portion 171 may be changed from the space I to the space II and be changed again from the space II to the space I. Hereinafter, these points may be referred to as bending direction turning points. In FIG. 6, a first bending direction turning point P1 and a second bending direction turning point P2 are illustrated on the first bent portion 171. In such an embodiment, as shown in FIG. 6, a curvature center on the left of the first bending direction turning point P1 is located in the space I, and a curvature center on the right of the first bending direction turning point P1 is located in the space II. In such an embodiment, a curvature center on the left of the second bending direction turning point P2 is located in the space II, and a curvature center on the right of the second bending direction turning point P2 is located in the space I.

When an evolute, i.e., a locus of a curvature center of each point on a curve is traced, as a point placed in the first valley region 171a approaches the first bending direction turning point P1, a curvature center in the space I is gradually away from the first bent portion 171 and is located at an infinite position at the first bending direction turning point P1. When the point is located between the first bending direction turning point P1 and the second bending direction turning point P2, a curvature center is located at an infinite position in the space II and is closest to the first bent portion 171 at an apex of the ridge region 171b. As the point approaches the second bending direction turning point P2, a curvature center is gradually away from the first bent portion 171 and is located at an infinite position at the second bending direction turning point P2. In such an embodiment, as the point placed at the second bending direction turning point P2 approaches the second valley region 171c, a curvature center is located at an infinite position in the space I and is gradually closer to the first bent portion 171. Therefore, the evolute may be disconnected between the first bending direction turning point P1 and the second bending direction turning point P2. In such an embodiment, a bending direction of the first bent portion 171 may be changed. Two bending direction turning points P1 and P2 are illustrated in FIG. 6, but the number of the bending direction turning points is not limited thereto. The number of the bending direction turning points may be various according to a shape of the first bent portion 171. In one exemplary embodiment, for example, the first bent portion 171 may have a shape having a single bending direction turning point, or three or more bending direction turning points.

The second lead wire 152 may include a bent portion 172 (hereinafter, will be referred to as a second bent portion). At least a part of the second bent portion 172 may be in a space between the first electrochemical device 110 and the second electrochemical device 120. The second bent portion 172 may have substantially the same shape as the first bent portion 171, but is not limited thereto. The second bent portion 172 may have a different shape from the first bent portion 171.

In an exemplary embodiment, as described above, the first and second lead wires 151 and 152 respectively have the first and second bent portions 171 and 172 between the first electrochemical device 110 and the second electrochemical device 120, such that the electrochemical device pack may have higher durability with respect to bending deformation. In such an embodiment, the first and second electrochemical devices 110 and 120 are disposed adjacent to each other, such that the electrochemical device pack is allowed to repeatedly and flexibly deform the shape thereof, and has a high energy density.

Figure 7:
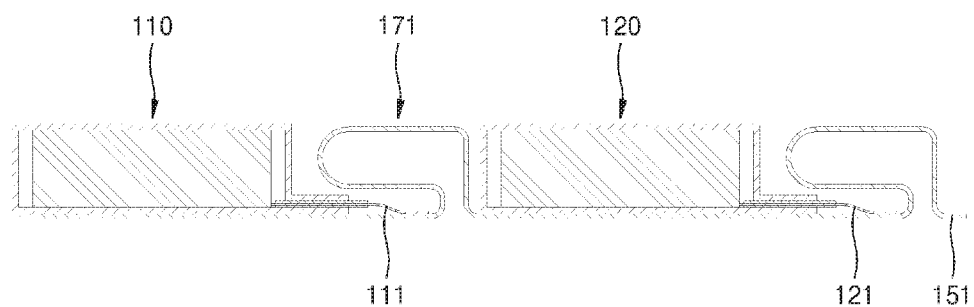
FIG. 7 is a cross-sectional view of an electrochemical device pack according to another exemplary embodiment.

FIG. 7 is a cross-sectional view of an electrochemical device pack according to another alternative exemplary embodiment. In such an embodiment, as described above, a second lead wire 152 is substantially equal or similar to a first lead wire 151. For convenience of description, the first lead wire 151 will be described in detail, and any repetitive detailed description of the second lead wire 152 will hereinafter be omitted.

Referring to FIG. 7, in an exemplary embodiment, a first surface or a second surface of the first lead wire 151 may face a bottom surface of each of first and second electrochemical devices 110 and 120. The first lead wire 151 may include a bent portion 171 (hereinafter, will be referred to as a first bent portion). At least a part of the first bent portion 171 may be in a space between the first electrochemical device 110 and the second electrochemical device 120. At least a part of the first bent portion 171 may include portions extending substantially opposite to each other, as shown in FIG. 7. At least a part of the first bent portion 171 may be between (e.g., overlap) a portion at which the first lead wire 151 is electrically connected to a first electrode terminal 111 of the first electrochemical device 110 or a portion at which the first lead wire 151 is electrically connected to a first electrode terminal 121 of the second electrochemical device 120, when viewed from a top view. The first lead wire 151 may be electrically connected to a surface (a bottom surface in FIG. 7) of each of the first electrode terminals 111 and 121 in the first and second electrochemical devices 110 and 120.

Figure 8:
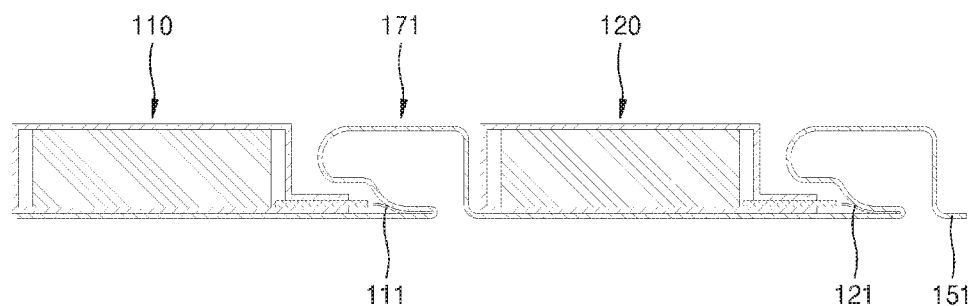
FIG. 8 is a cross-sectional view of an electrochemical device pack according to another exemplary embodiment.

FIG. 8 is a cross-sectional view of an electrochemical device pack according to another alternative exemplary embodiment. Referring to FIG. 8, a first surface or a second surface of a first lead wire 151 may be electrically connected to both surfaces (e.g., top and bottom surfaces) of each of first electrode terminals 111 and 121 of the first and second electrochemical devices 110 and 120.

Figure 9:
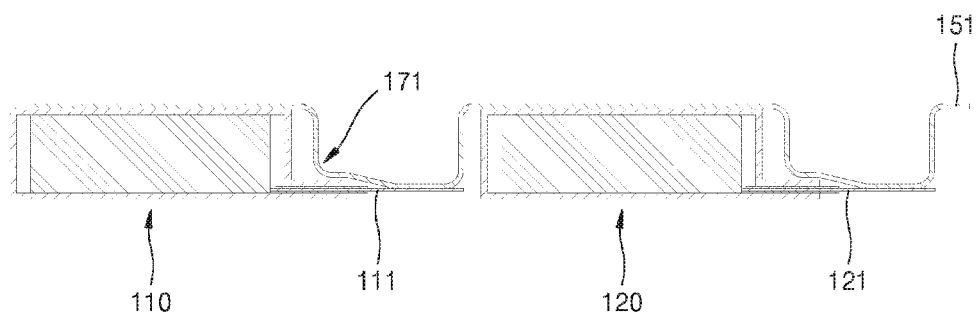
FIG. 9 is a cross-sectional view of an electrochemical device pack according to another exemplary embodiment.

FIG. 9 is a cross-sectional view of an electrochemical device pack according to another alternative exemplary embodiment.

Referring to FIG. 9, in an exemplary embodiment, a first surface or a second surface of a first lead wire 151 may face a top surface of each of first and second electrochemical devices 110 and 120. The first lead wire 151 may include a first bent portion 171. The first lead wire 151 may be electrically connected to a surface (a top surface in FIG. 9) of each of first electrode terminals 111 and 121 in first and second electrochemical devices 110 and 120.

Figure 10:
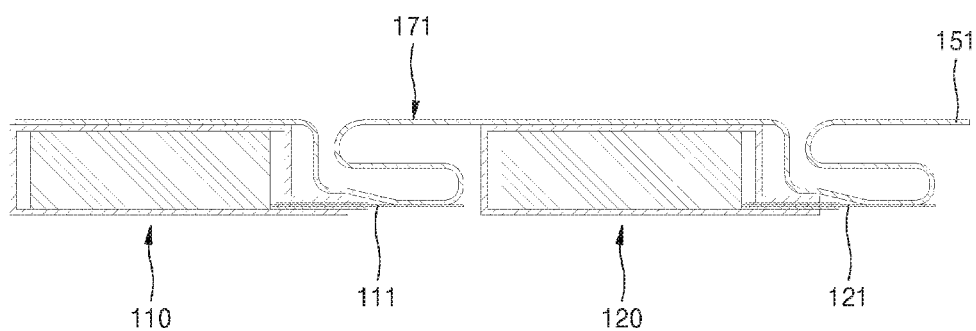
FIG. 10 is a cross-sectional view of an electrochemical device pack according to another exemplary embodiment.

FIG. 10 is a cross-sectional view of an electrochemical device pack according to another alternative exemplary embodiment.

Referring to FIG. 10, a first surface or a second surface of a first lead wire 151 may face a top surface of each of first and second electrochemical devices 110 and 120. The first lead wire 151 may include a first bent portion 171. The first bent portion 171 illustrated in FIG. 10 may have a different shape from the first bent portion 171 illustrated in FIG. 9.

Embodiments in which a first bent portion 271a of a first electrode terminal 111 and a first bent portion 271b of a first lead wire 151 are provided between a first electrochemical device 110 and a second electrochemical device 120 are illustrated in FIGS. 11 to 19.

Figure 11:
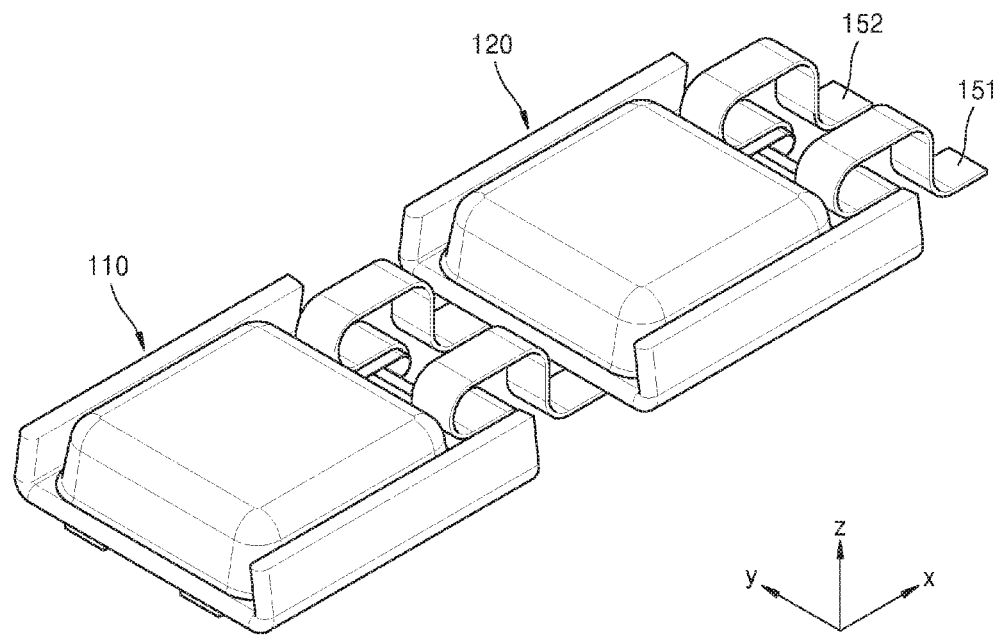
FIG. 11 is a perspective view of an electrochemical device pack according to another exemplary embodiment.
Figure 12:
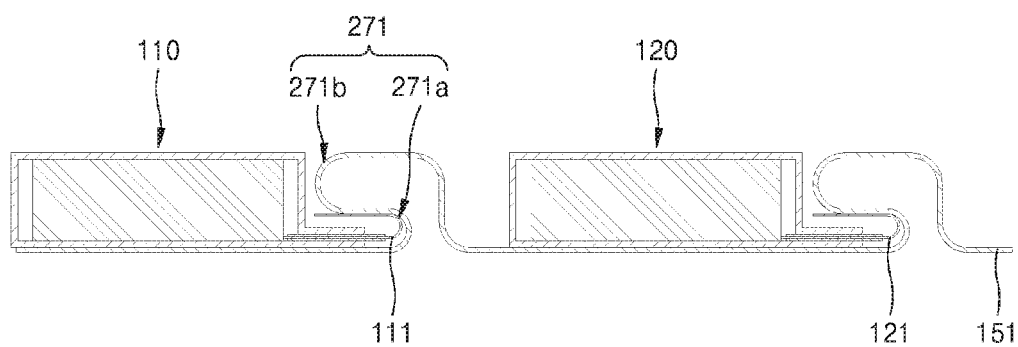
FIG. 12 is a longitudinal cross-sectional view of the electrochemical device pack illustrated in FIG. 11.

FIG. 11 is a perspective view of an electrochemical device pack according to another alternative exemplary embodiment. FIG. 12 is a longitudinal cross-sectional view of the electrochemical device pack illustrated in FIG. 11.

Referring to FIGS. 11 and 12, an exemplary embodiment of the electrochemical device pack may include first and second electrochemical devices 110 and 120, and first and second lead wires 151 and 152 that electrically connect the first and second electrochemical devices 110 and 120 to each other. Each of the first and second electrochemical devices 110 and 120 may have a top surface and a bottom surface in a thickness direction of the electrochemical device pack. Each of the first and second lead wires 151 and 152 may have a first surface and a second surface in the thickness direction of the electrochemical device pack. The first surface or the second surface of each of the first and second lead wires 151 and 152 may face the bottom surface of each of the first and second electrochemical devices 110 and 120.

The first lead wire 151 may be electrically connected to first electrode terminals 111 and 121 of the first and second electrochemical devices 110 and 120. The second lead wire 152 may be electrically connected to second electrode terminals 112 and 122 of the first and second electrochemical devices 110 and 120. The first and second lead wires 151 and 152 may have a ribbon shape.

A first bent portion 271 may be defined between the first electrochemical device 110 and the second electrochemical device 120. The first bent portion 271 may include a first bent portion 271a of the first electrode terminal 111 and a first bent portion 271b of the first lead wire 151. At least a part of the first bent portion 271 may be defined between a portion at which the first lead wire 151 is electrically connected to the first electrode terminal 111 of the first electrochemical device 110 and a portion at which the first lead wire 151 is electrically connected to the first electrode terminal 121 of the second electrochemical device 120. The first lead wire 151 may be directly electrically connected to the first electrode terminal 111 of the first electrochemical device 110 at a connection portion. At least a part of the connection portion may be defined in a flat portion disposed within a section of the first bent portion 271.

A maximum height of the first bent portion 271 in the thickness direction of the electrochemical device pack may be about 1 mm or more. The maximum height of the first bent portion 271 in the thickness direction of the electrochemical device pack may be about 30% or more of a maximum thickness of the first electrochemical device 110 or the second electrochemical device 120. Each of the first bent portion 271a of the first electrode terminal 111 and the first bent portion 271b of the first lead wire 151 may include a portion bent at an angle of about 45° or more with respect to a bending starting portion.

In such an embodiment, a curvature center of each of points on the first bent portion 271a of the first electrode terminal 111 is located in one of a first space and a second space opposite each other with respect to the first bent portion 271a of the first electrode terminal 111, and when the point on the first bent portion 271a of the first electrode terminal 111, of which the curvature center is changed from the first space to the second space or from the second space to the first space, is referred to as a bending direction turning point, the first bent portion 271a of the first electrode terminal 111 may have at least one bending direction turning point. In such an embodiment, a curvature center of each of points on the first bent portion 271b of the first lead wire 151 is located in one of the first space and the second space opposite each other with respect to the first bent portion 271b of the first lead wire 151, and when the point on the first bent portion 271b of the first lead wire 151, of which the curvature center is changed from the first space to the second space or from the second space to the first space, is referred to as a bending direction turning point, the first bent portion 271b of the first lead wire 151 may have at least one bending direction turning point.

Figure 13:
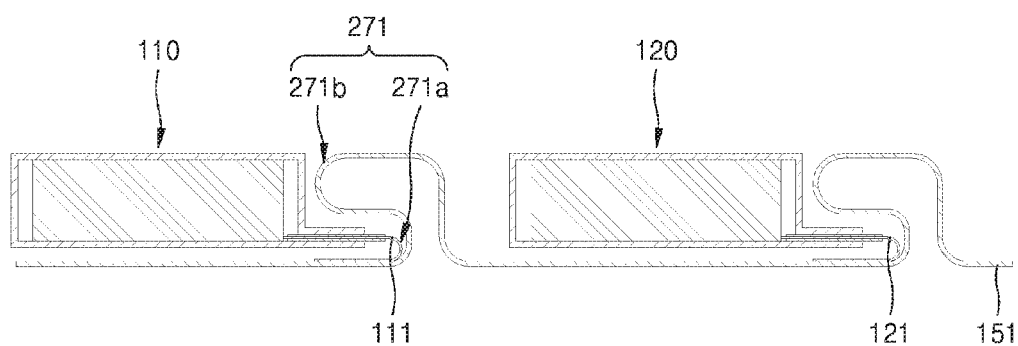
FIG. 13 is a cross-sectional view of an electrochemical device pack according to another exemplary embodiment.

FIG. 13 is a cross-sectional view of an electrochemical device pack according to another alternative exemplary embodiment. Referring to FIG. 13, a first bent portion 271a of the first electrode terminal 111 may have a downwardly bent shape.

Figure 14:
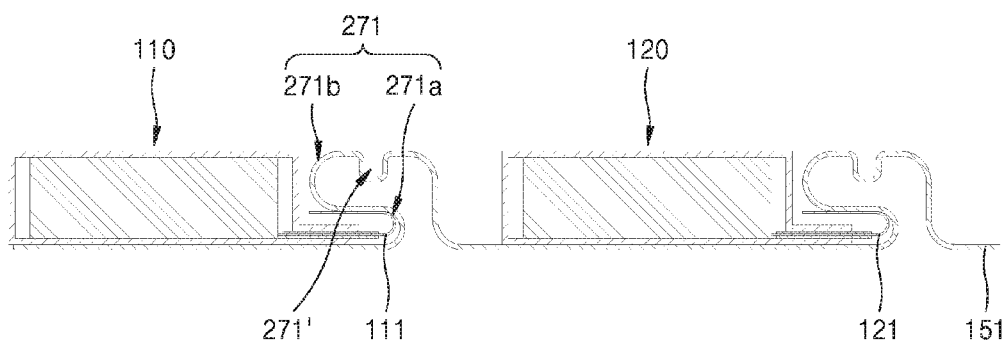
FIG. 14 is a cross-sectional view of an electrochemical device pack according to another exemplary embodiment.

FIG. 14 is a cross-sectional view of an electrochemical device pack according to another alternative exemplary embodiment. Referring to FIG. 14, an additional bent portion 271' may be defined at a first bent portion 271b of a first lead wire 151. The additional bent portion 271' may improve the durability of the electrochemical device pact with respect to bending deformation.

Figure 15:
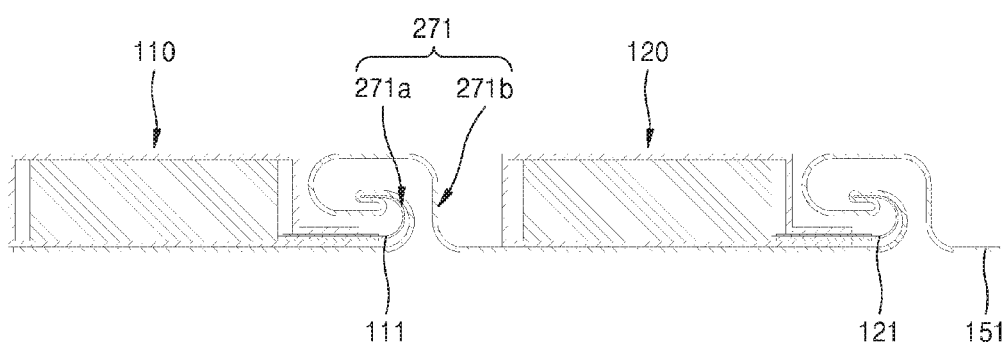
FIG. 15 is a cross-sectional view of an electrochemical device pack according to another exemplary embodiment.

FIG. 15 is a cross-sectional view of an electrochemical device pack according to another alternative exemplary embodiment. Referring to FIG. 15, a first lead wire 151 may be bent in a way such that the first lead wire 151 is electrically connected to both surfaces (e.g., the first and second surfaces) of a first electrode terminal 111.

Figure 16:
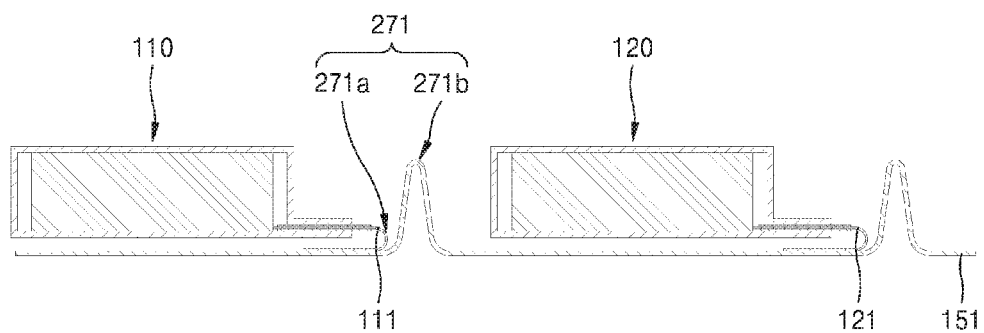
FIG. 16 is a cross-sectional view of an electrochemical device pack according to another exemplary embodiment.

FIG. 16 is a cross-sectional view of an electrochemical device pack according to another alternative exemplary embodiment. Referring to FIG. 16, a first bent portion 271 may include a first bent portion 271a of a first electrode terminal 111 and a first bent portion 271b of a first lead wire 151. In such an embodiment, as shown in FIG. 16, the first bent portion 271a of the first electrode terminal 111 is electrically connected to a flat portion (e.g., a portion extending in the length direction) of the first lead wire 151.

Figure 17:
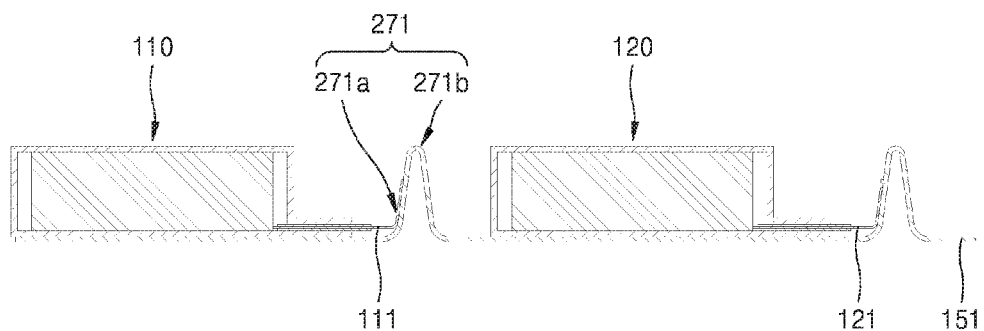
FIG. 17 is a cross-sectional view of an electrochemical device pack according to another exemplary embodiment.

FIG. 17 is a cross-sectional view of an electrochemical device pack according to another alternative exemplary embodiment. Referring to FIG. 17, a first bent portion 271 may include a first bent portion 271a of a first electrode terminal 111 and a first bent portion 271b of a first lead wire 151. In such an embodiment, as shown in FIG. 17, the first bent portion 271a of the first electrode terminal 111 is electrically connected to a surface of a flat portion of the first bent portion 271b in the first lead wire 151.

Figure 18:
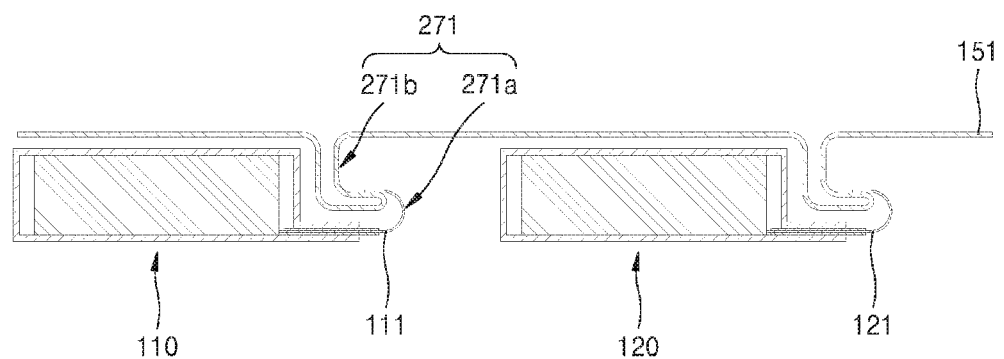
FIG. 18 is a cross-sectional view of an electrochemical device pack according to another exemplary embodiment.

FIG. 18 is a cross-sectional view of an electrochemical device pack according to another alternative exemplary embodiment. Referring to FIG. 18, a first surface or a second surface of a first lead wire 151 may face a top surface of each of first and second electrochemical devices 110 and 120. A first bent portion 271 may include a first bent portion 271a of a first electrode terminal 111 and a first bent portion 271b of the first lead wire 151. In such an embodiment, as shown in FIG. 18, the first bent portion 271b of the first lead wire 151 is disposed in a space defined by the first bent portion 271a in the first electrode terminal 111 and is electrically connected to an inner surface of the first bent portion 271a in the first electrode terminal 111.

Figure 19:
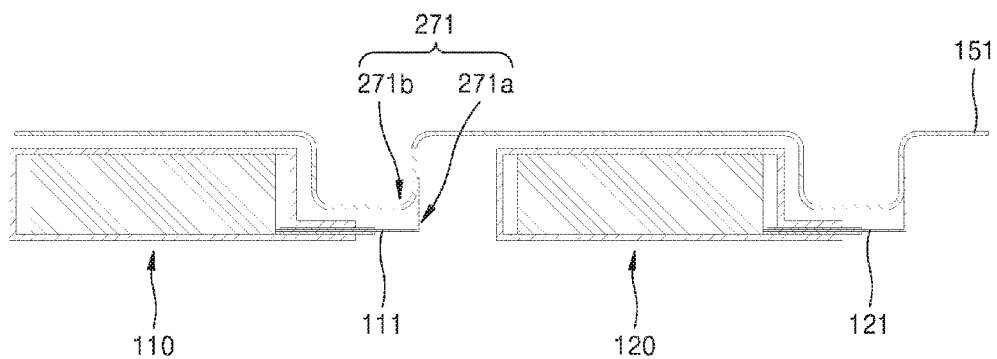
FIG. 19 is a cross-sectional view of an electrochemical device pack according to another exemplary embodiment.

FIG. 19 is a cross-sectional view of an electrochemical device pack according to another alternative exemplary embodiment. Referring to FIG. 19, a first surface or a second surface of a first lead wire 151 may face a top surface of each of first and second electrochemical devices 110 and 120. A first bent portion 271 may include a first bent portion 271a of a first electrode terminal 111 and a first bent portion 271b of the first lead wire 151. In such an embodiment, as shown in FIG. 19, the first bent portion 271b of the first lead wire 151 is electrically connected to a side surface of the first bent portion 271a in the first electrode terminal 111. In such an embodiment, a portion of the first bent portion 271a in the first electrode terminal 111 may be bent upwardly substantially in the thickness direction of the electrochemical device pack.

Embodiments in which a first bent portion 371 of a first electrode terminal 111 is disposed between a first electrochemical device 110 and a second electrochemical device 120 are illustrated in FIGS. 20 to 24.

Figure 20:
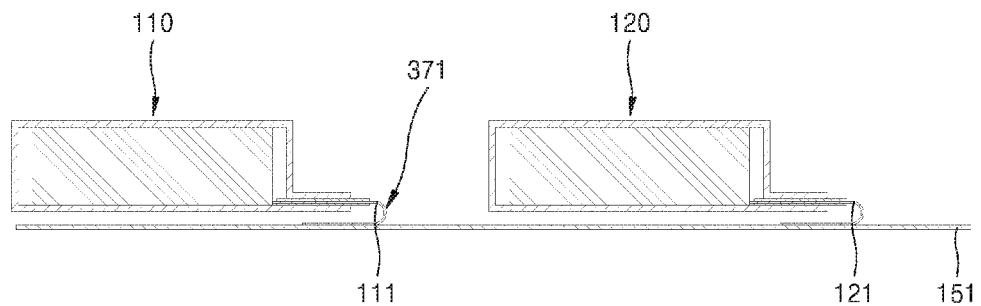
FIG. 20 is a cross-sectional view of an electrochemical device pack according to another exemplary embodiment.

FIG. 20 is a cross-sectional view of an electrochemical device pack according to another alternative exemplary embodiment.

Referring to FIG. 20, a first surface or a second surface of a first lead wire 151 may face a bottom surface of each of first and second electrochemical devices 110 and 120. A first electrode terminal 111 may include a first bent portion 371.

In such an embodiment, the first bent portion 371 has a downwardly bent shape, as illustrated in FIG. 20.

In such an embodiment, as described above, a maximum height of the first bent portion 371 in a thickness direction of the electrochemical device pack may be about 1 mm or more. The maximum height of the first bent portion 371 in the thickness direction of the electrochemical device pack may be about 30% or more of a maximum thickness of the first electrochemical device 110 or the second electrochemical device 120. The first bent portion 371 may include a portion bent at an angle of about 45° or more with respect to a bending starting portion.

In such an embodiment, as described above, a curvature center of each of points on the first bent portion 371 is located in one of a first space and a second space opposite each other with respect to the first bent portion 371, and when the point on the first bent portion 371, of which the curvature center is changed from the first space to the second space or from the second space to the first space, is referred to as a bending direction turning point, the first bent portion 371 may have at least one bending direction turning point.

Figure 21:
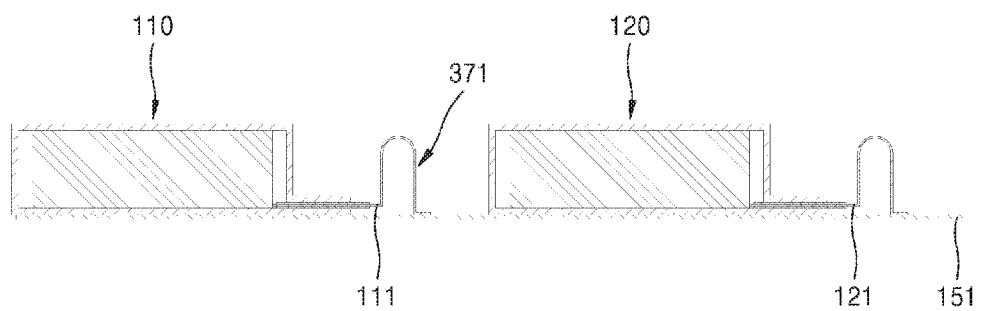
FIG. 21 is a cross-sectional view of an electrochemical device pack according to another exemplary embodiment.

FIG. 21 is a cross-sectional view of an electrochemical device pack according to another alternative exemplary embodiment. Referring to FIG. 21, a first surface or a second surface of a first lead wire 151 may face a bottom surface of each of first and second electrochemical devices 110 and 120. A first electrode terminal 111 may include a first bent portion 371. In such an embodiment, the first bent portion 371 protrudes upwardly, as illustrated in FIG. 21.

Figure 22:
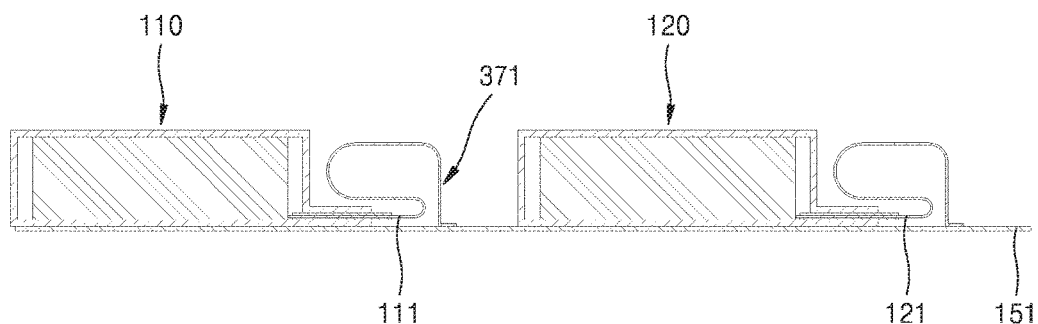
FIG. 22 is a cross-sectional view of an electrochemical device pack according to another exemplary embodiment.

FIG. 22 is a cross-sectional view of an electrochemical device pack according to another alternative exemplary embodiment. Referring to FIG. 22, a first surface or a second surface of a first lead wire 151 may face a bottom surface of each of first and second electrochemical devices 110 and 120. A first electrode terminal 111 may include a first bent portion 371. In such an embodiment, the first bent portion 371 is bent toward the first electrochemical device 110, as illustrated in FIG. 22.

Figure 23:
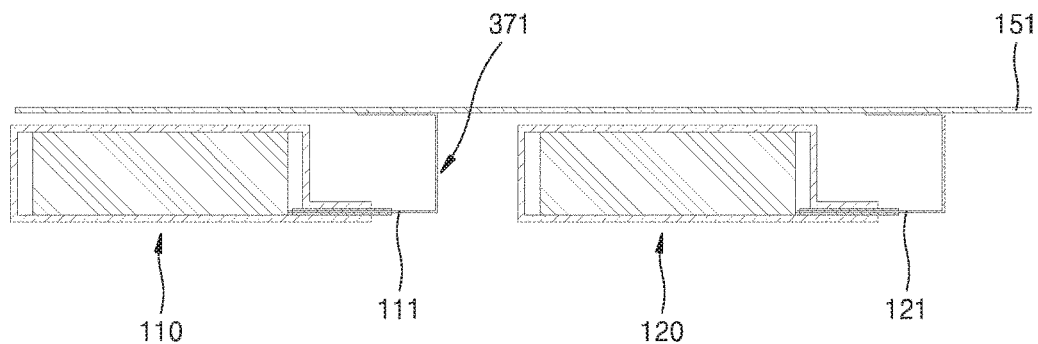
FIG. 23 is a cross-sectional view of an electrochemical device pack according to another exemplary embodiment.

FIG. 23 is a cross-sectional view of an electrochemical device pack according to another alternative exemplary embodiment. Referring to FIG. 23, a first surface or a second surface of a first lead wire 151 may face a top surface of each of first and second electrochemical devices 110 and 120. A first electrode terminal 111 may include a first bent portion 371. In such an embodiment, the first bent portion 371 is bent at a right angle, as illustrated in FIG. 23.

Figure 24:
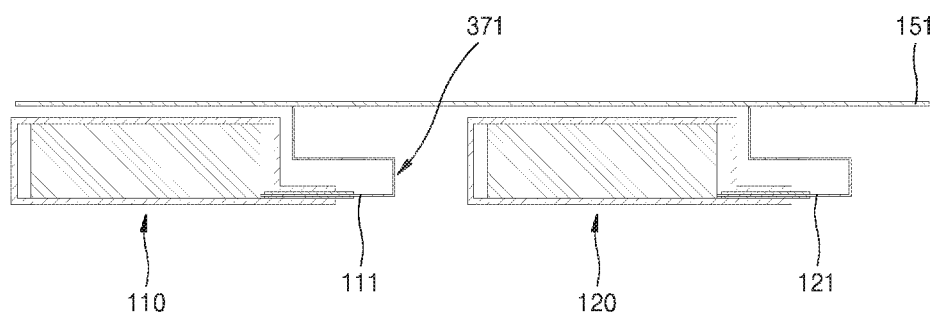
FIG. 24 is a cross-sectional view of an electrochemical device pack according to another exemplary embodiment.

FIG. 24 is a cross-sectional view of an electrochemical device pack according to another alternative exemplary embodiment. Referring to FIG. 24, a first surface or a second surface of a first lead wire 151 may face a top surface of each of first and second electrochemical devices 110 and 120. A first electrode terminal 111 may include a first bent portion 371. In such an embodiment, the first bent portion 371 is bent a plurality of times at a right angle, as illustrated in FIG. 24.

Figure 25:
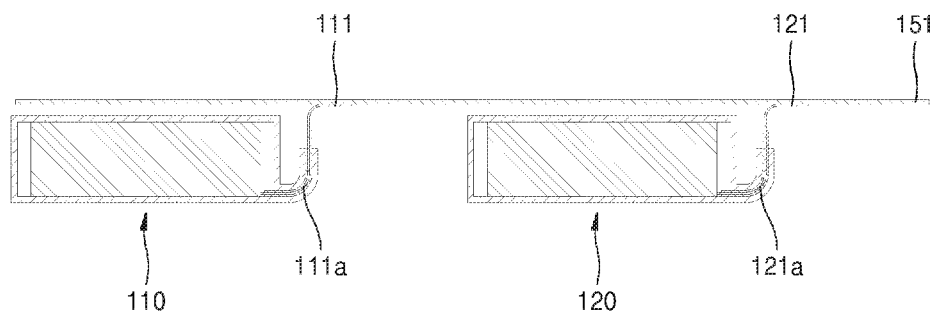
FIG. 25 is a cross-sectional view of an electrochemical device pack according to another exemplary embodiment.

FIG. 25 is a cross-sectional view of an electrochemical device pack according to another alternative exemplary embodiment. Referring to FIG. 25, first electrode terminals 111 and 121 of first and second electrochemical devices 110 and 120 may respectively include lead portions 111a and 121a that are bent or curved along an axis in a width direction of the electrochemical device pack and respectively extend outward from the insides of the first and second electrochemical devices 110 and 120. In such an embodiment, the lead portions 111a and 121a of the first electrode terminals 111 and 121 are bent upward, as illustrated in FIG. 25.

Figure 26:
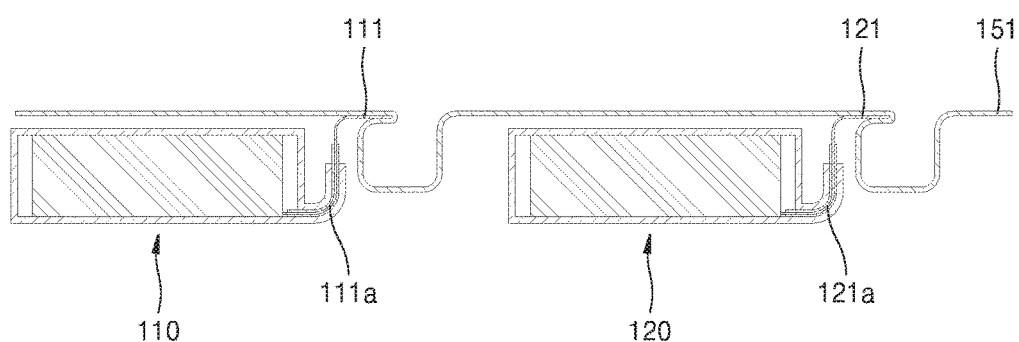
FIG. 26 is a cross-sectional view of an electrochemical device pack according to another exemplary embodiment.

FIG. 26 is a cross-sectional view of an electrochemical device pack according to another alternative exemplary embodiment. Referring to FIG. 26, first electrode terminals 111 and 121 of first and second electrochemical devices 110 and 120 may respectively include leas portions 111a and 121a that are bent or curved with respect to an axis in a width direction of the electrochemical device pack and respectively extend outward from the insides of the first and second electrochemical devices 110 and 120. In such an embodiment, both surfaces of each of the first electrode terminals 111 and 121 are electrically connected to a first lead wire 151, as illustrated in FIG. 26.

Figure 27:
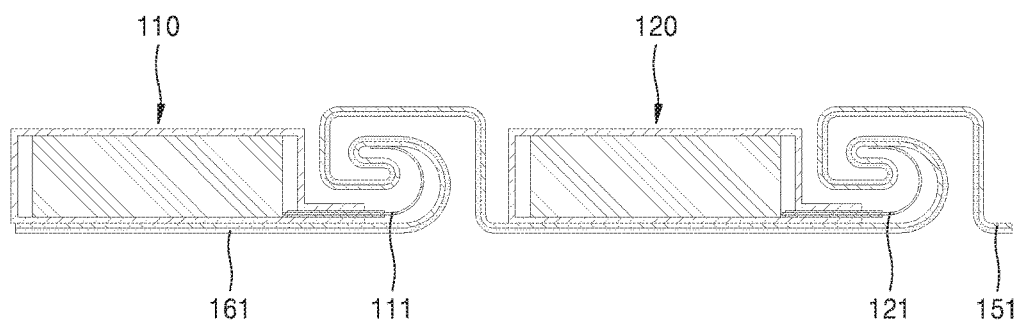
FIG. 27 is a cross-sectional view of an electrochemical device pack according to another exemplary embodiment.

FIG. 27 is a cross-sectional view of an electrochemical device pack according to another alternative exemplary embodiment. Referring to FIG. 27, a first adhesive layer 161 may be attached to a first surface or a second surface of a first lead wire 151. Alternatively, the adhesive layer 161 may be attached to each of the first and second surfaces of the lead wire 151. In an embodiment, a second adhesive layer (not illustrated) may be provided on a first surface or a second surface of a second lead wire (152 of FIG. 1). Although not illustrated in FIG. 27, the first and second lead wires 151 and 152 may be attached to an insulating film (not illustrated).

Figure 28:
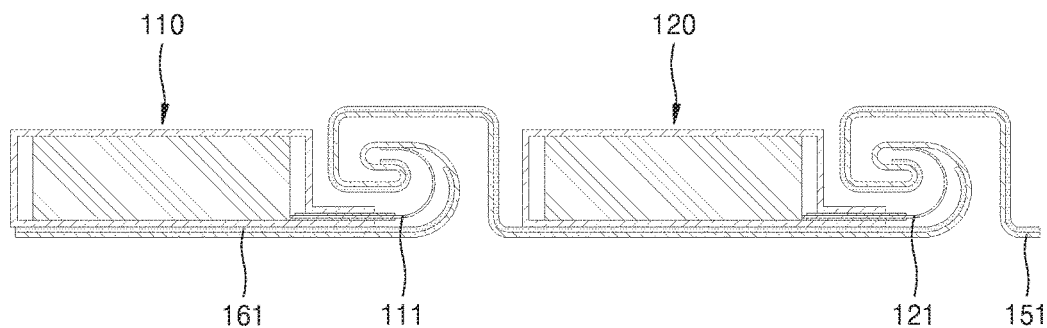
FIG. 28 is a cross-sectional view of an electrochemical device pack according to another exemplary embodiment.

FIG. 28 is a cross-sectional view of an electrochemical device pack according to another alternative exemplary embodiment. Referring to FIG. 28, a first insulating layer 161 may be between a first lead wire 151 and a first electrochemical device 110. In such an embodiment, the first insulating layer 161 may include an adhesive for attaching the first lead wire 151 and the first electrochemical device 110. In such an embodiment, a second insulating layer (not illustrated) may be between a second lead wire 152 and the first electrochemical device 110.

Figure 29:
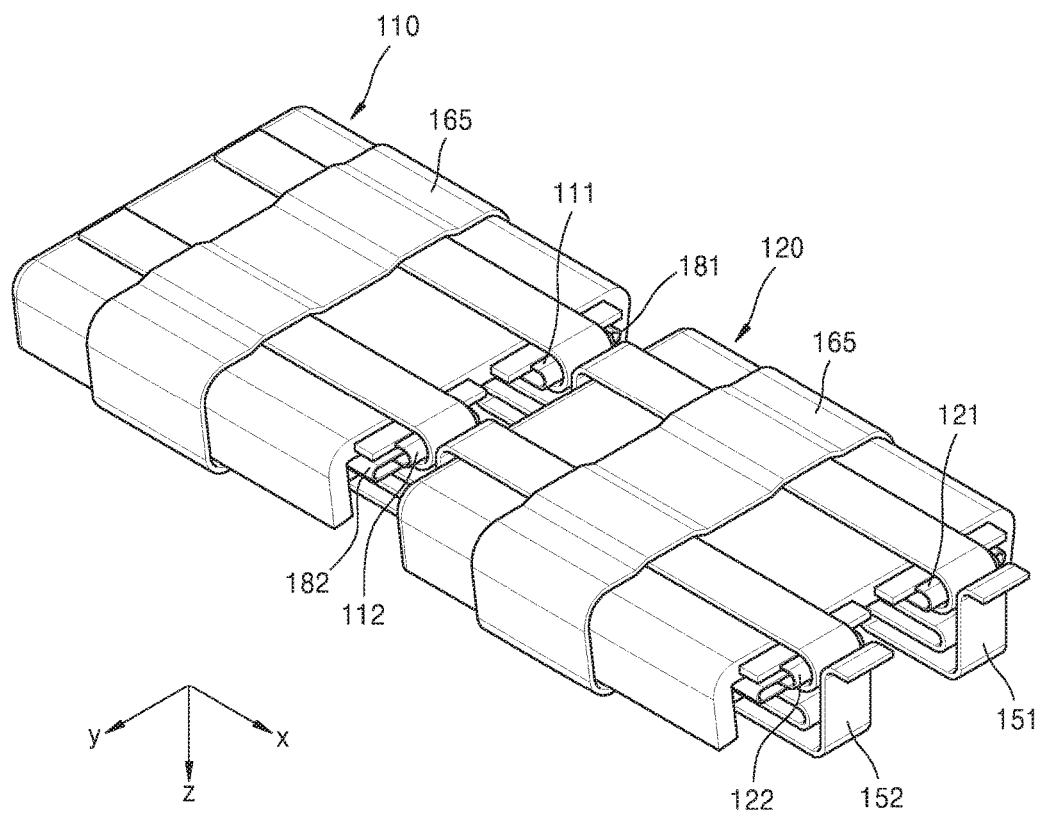
FIG. 29 is a bottom perspective view of an electrochemical device pack according to another exemplary embodiment.

FIG. 29 is a bottom perspective view of an electrochemical device pack according to another alternative exemplary embodiment. Referring to FIG. 29, an adhesive tape 165 may be further disposed to partially cover a first lead wire 151 and a first electrochemical device 110 and fix the first lead wire 151 and the first electrochemical device 110 to each other. In such an embodiment, the adhesive tape 165 may partially cover a second lead wire 152 and the first electrochemical device 110 and fix the second lead wire 152 and the first electrochemical device 110 to each other.

Figure 30:
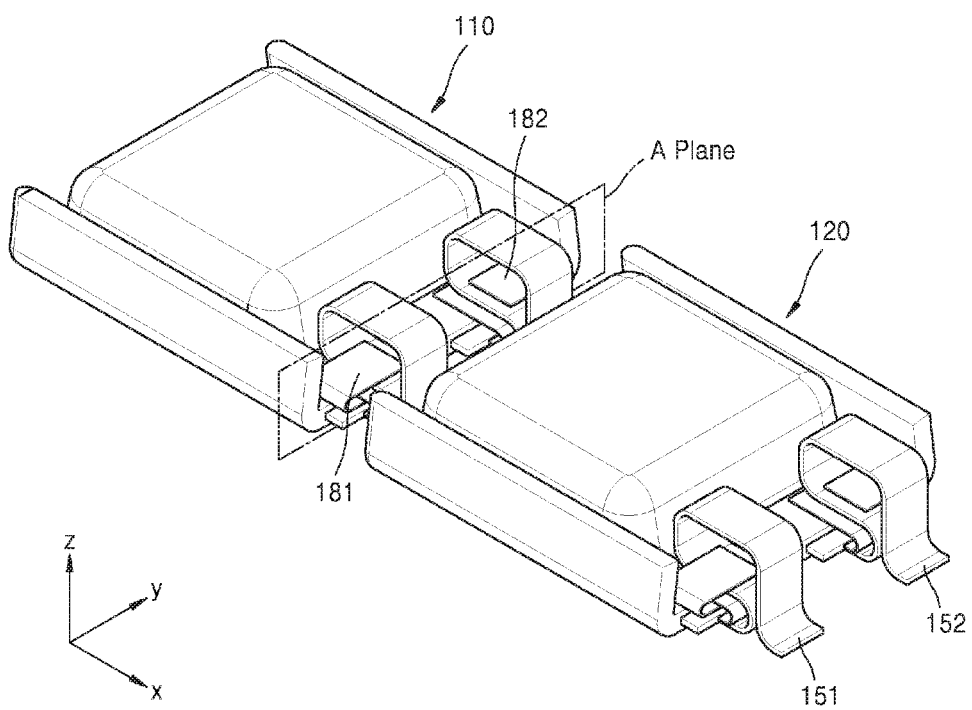
FIG. 30 is a top perspective view of an electrochemical device pack according to another exemplary embodiment.
Figure 31:
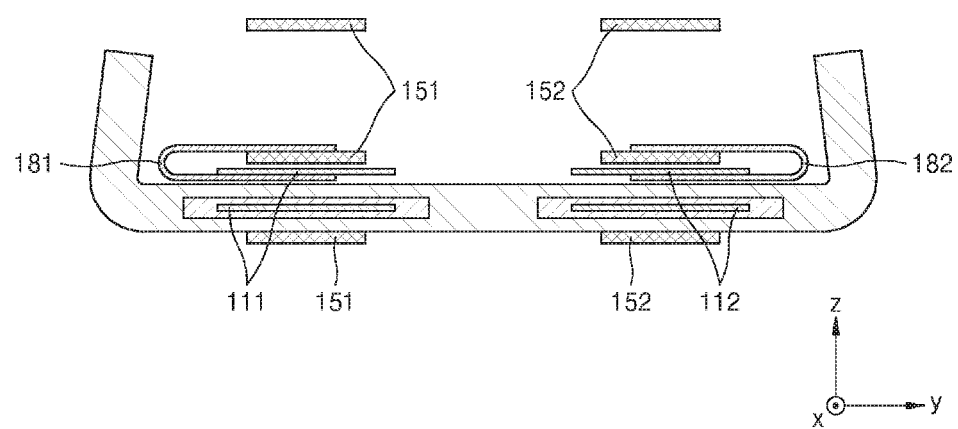
FIG. 31 is a cross-sectional view taken along a plane A of FIG. 30.

FIG. 30 is a top perspective view of an electrochemical device pack according to another alternative exemplary embodiment. FIG. 31 is a cross-sectional view taken along plane A of FIG. 30.

Referring to FIGS. 30 and 31, a first connection wire 181 may be disposed to electrically connect a first lead wire 151 to a first electrode terminal 111 of a first electrochemical device 110. A second connection wire 182 may be disposed to electrically connect a second lead wire 152 to a second electrode terminal 112 of the first electrochemical device 110. The first and second connection wires 181 and 182 may have a bent shape.

Figure 32:
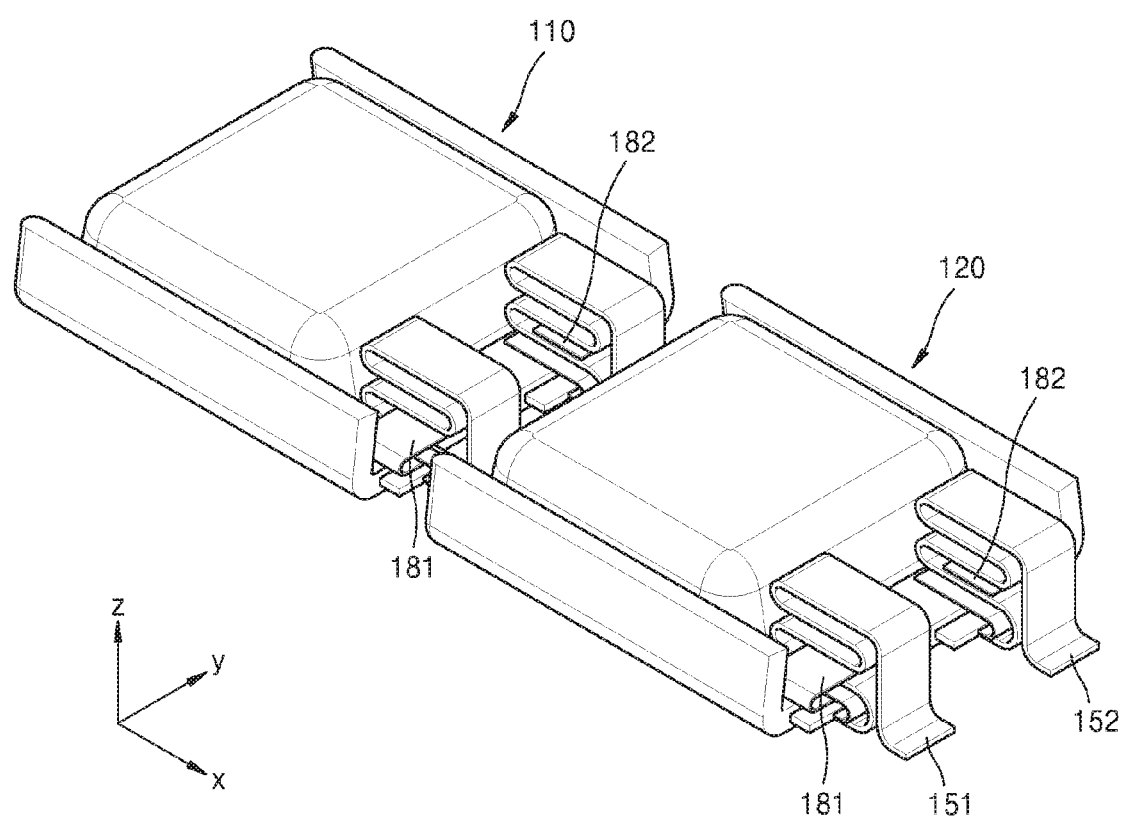
FIG. 32 is a top perspective view of an electrochemical device pack according to another exemplary embodiment.
Figure 33:
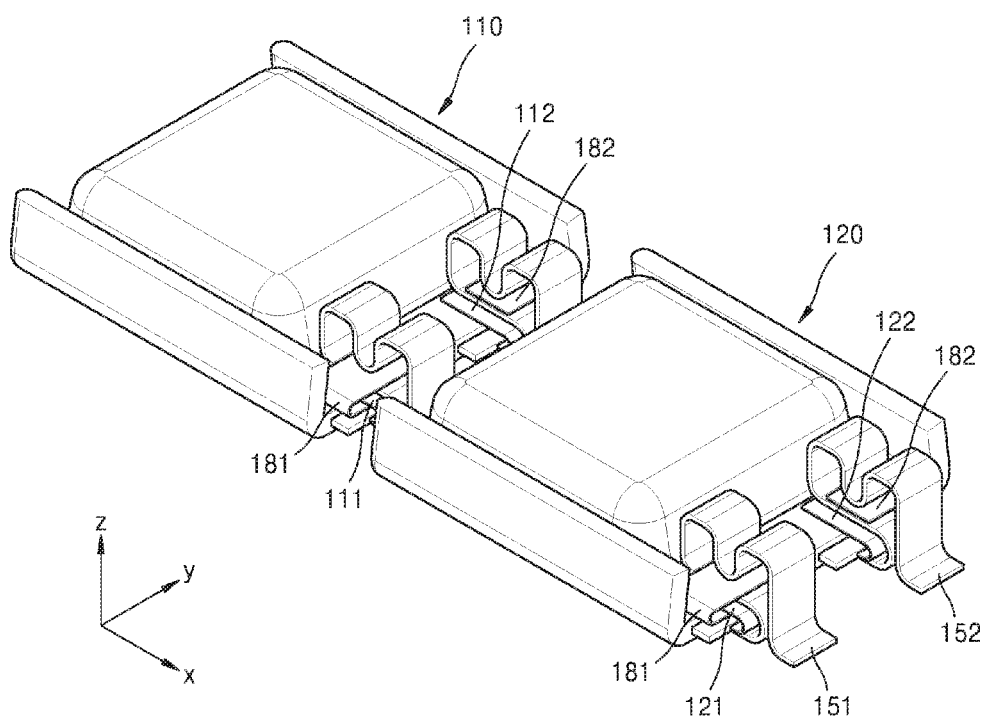
FIG. 33 is a top perspective view of an electrochemical device pack according to another exemplary embodiment.
Figure 34:
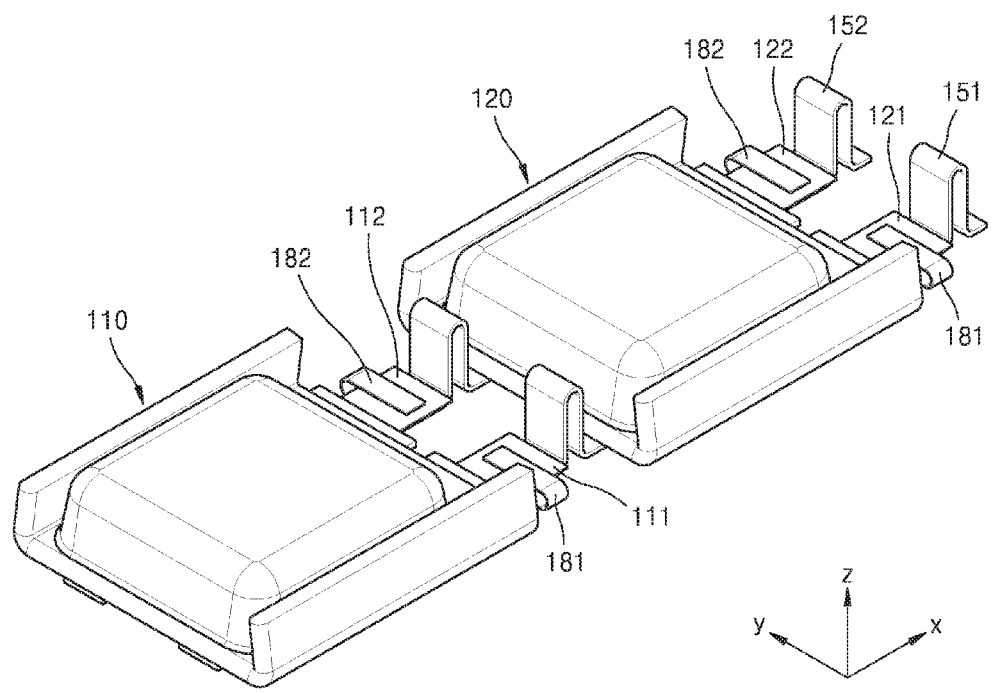
FIG. 34 is a top perspective view of an electrochemical device pack according to another exemplary embodiment.

Alternative exemplary embodiments, in which the first and second lead wires 151 and 152 are modified, are illustrated in FIGS. 32 to 34. In such alternative embodiments, as shown in FIGS. 32 to 34, a first connection wire 181 may electrically connect a first lead wire 151 to a first electrode terminal 111 of a first electrochemical device 110, and a second connection wire 182 may electrically connect a second lead wire 152 to a second electrode terminal 112 of the first electrochemical device 110.

Figure 35:
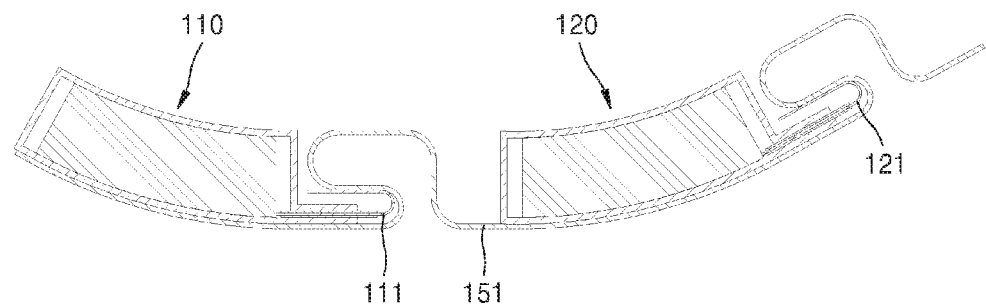
FIG. 35 is a cross-sectional view of an electrochemical device pack according to another exemplary embodiment.

FIG. 35 is a cross-sectional view of an electrochemical device pack according to another alternative exemplary embodiment. Referring to FIG. 35, first and second electrochemical devices 110 and 120 may have a shape bent or curved along a length direction in the electrochemical device pack. In such an embodiment, each of the first and second electrochemical devices 110 and 120 may have a bent shape, s illustrated in FIG. 35. In an alternative exemplary embodiment, only one of the first and second electrochemical devices 110 and 120 may have the bent shape.

Figure 36:
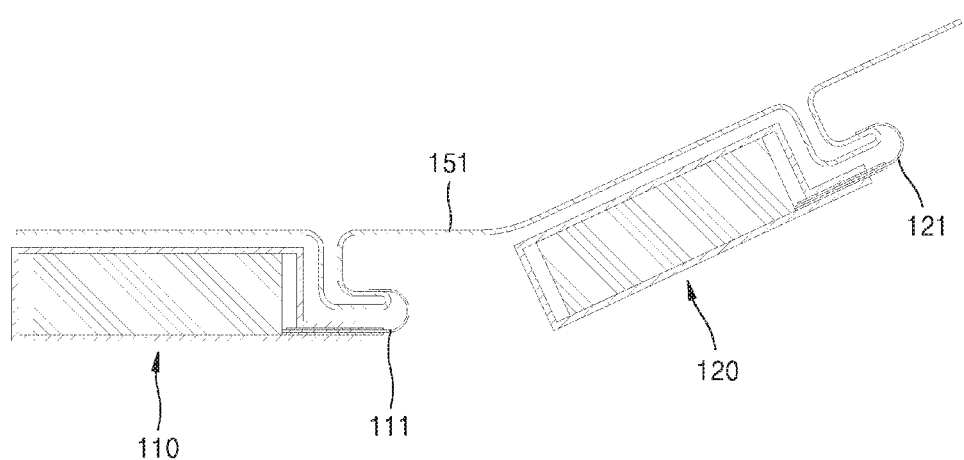
FIG. 36 is a cross-sectional view of an electrochemical device pack according to another exemplary embodiment.

FIG. 36 is a cross-sectional view of an electrochemical device pack according to another alternative exemplary embodiment. Referring to FIG. 36, in the electrochemical device pack, a first lead wire 151 may be bent in a way such that a first electrochemical device 110 and a second electrochemical device 120 are inclined with respect to each other.

According to exemplary embodiments, as described herein, the plurality of electrochemical devices are connected in parallel by the lead wires, the electrochemical device pack may have high capacity. In such embodiments, the lead wires, which connect the plurality of electrochemical devices to each other, have a ribbon shape, and the electrochemical device pack may have high durability with respect to bending. In such embodiments, the thin lead wires are disposed to be adjacent to the plurality of electrochemical devices, a volume of a space occupied by the lead wires in the electrochemical device pack may be effectively minimized. Accordingly, the electrochemical device pack may be capable of repeatedly and flexibly deforming, having improved durability and reliability with respect to repeated deformation, and also having a high energy density.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrochemical device pack, in which a length direction, a width direction and a thickness direction are defined, the electrochemical device pack comprising:
   first and second electrochemical devices disposed in the length direction, wherein each of the first and second electrochemical devices has a top surface and a bottom surface in the thickness direction; and
   a first lead wire which has a ribbon shape, extends substantially in the length direction, and has a first surface and a second surface in the thickness direction, wherein
   the first electrochemical device comprises a packing material, and first and second electrode terminals exposed to an outside thereof,
   the second electrochemical device comprises a packing material, and first and second electrode terminals exposed to an outside thereof,
   the packing material of the first electrochemical device is spaced apart and disconnected from the packing material of the second electrochemical device,
   the first lead wire is electrically connected to the first electrode terminal of the first electrochemical device and the first electrode terminal of the second electrochemical device, and
   the first surface or the second surface of the first lead wire faces the top surface or bottom surface of the first electrochemical device.

2. The electrochemical device pack of claim 1, wherein at least one of the first lead wire and the first electrode terminal of the first electrochemical device comprises a bent portion.

3. The electrochemical device pack of claim 2, wherein at least a part of the bent portion is in a space between the first electrochemical device and the second electrochemical device.

4. The electrochemical device pack of claim 2, wherein
   a curvature center of each of points on the bent portion is located in one of a first space and a second space opposite each other with respect to the first bent portion, and
   when the bent portion has a point, of which the curvature center is changed from the first space to the second space or from the second space to the first space.

5. The electrochemical device pack of claim 2, wherein
   the first lead wire comprises the bent portion, and
   at least a part of the bent portion of the first lead wire is between a portion, at which the first lead wire is electrically connected to the first electrode terminal of the first electrochemical device, and a portion, at which the first lead wire is electrically connected to the first electrode terminal of the second electrochemical device.

6. The electrochemical device pack of claim 5, wherein
   the first lead wire is directly electrically connected to the first electrode terminal of the first electrochemical device at a connection portion, and
   at least a part of the connection portion is at a flat portion of the bent portion.

7. The electrochemical device pack of claim 1, wherein the first electrode terminal or the second electrode terminal of the first electrochemical device comprises a lead portion which extends outward from an inside of the first electrochemical device along the length direction.

8. The electrochemical device pack of claim 1, wherein the first electrode terminal or the second electrode terminal of the first electrochemical device comprises a lead portion curved along an axis in the width direction and extending outward from an inside of the first electrochemical device.

9. The electrochemical device pack of claim 1, further comprising:
   an insulating layer in contact with at least one of the first and second surfaces of the first lead wire.

10. The electrochemical device pack of claim 9, wherein the insulating layer comprises an adhesive and is between the first lead wire and the first electrochemical device.

11. The electrochemical device pack of claim 1, further comprising:
   an adhesive tape which partially covers the first lead wire and the first electrochemical device and fixes the first lead wire and the first electrochemical device to each other.

12. The electrochemical device pack of claim 1, further comprising:
   a connection wire which electrically connects the first lead wire to the first electrode terminal of the first electrochemical device.

13. The electrochemical device pack of claim 1, wherein at least one of the first electrochemical device and the second electrochemical device is curved along the length direction.

14. The electrochemical device pack of claim 1, wherein the electrochemical device pack is bent in a way such that the first electrochemical device and the second electrochemical device are inclined with respect to each other.

15. The electrochemical device pack of claim 1, further comprising:
- a third electrochemical device electrically connected to the first lead wire.

16. The electrochemical device pack of claim 1, further comprising:
- a second lead wire having a ribbon shape and extending substantially in the length direction,
- wherein the second lead wire is electrically connected to the second electrode terminal of the first electrochemical device and the second electrode terminal of the second electrochemical device.

17. The electrochemical device pack of claim 16, further comprising:
- an insulating film attached to the first and second lead wires.

18. The electrochemical device pack of claim 16, wherein the second lead wire comprises a bent portion between a portion, at which the second lead wire is electrically connected to the second electrode terminal of the first electrochemical device, and a portion, at which the second lead wire is electrically connected to the second electrode terminal of the second electrochemical device.

19. The electrochemical device pack of claim 18, wherein
- a curvature center of each of points on the bent portion of the second lead wire is located in one of a first space and a second space opposite each other with respect to the bent portion of the second lead wire, and
- when the bent portion of the second lead wire has a point, of which the curvature center is changed from the first space to the second space or from the second space to the first space.

20. The electrochemical device pack of claim 18, wherein
- at least one of the first lead wire and the first electrode terminal of the first electrochemical device comprises a bent portion, and
- the bent portion of the second lead wire has substantially the same shape as the bent portion of the at least one of the first lead wire and the first electrode terminal of the first electrochemical device.

* * * * *